2,726,981

METHOD OF COMBATTING FUNGUS ORGANISMS AND N-ARYL CHLOROSUCCINIMIDE COMPOSITIONS THEREFOR

Calvin N. Wolf and Rex D. Closson, Detroit, and Waldo B. Ligett, Pontiac, Mich., assignors to Ethyl Corporation, New York, N. Y., a corporation of Delaware No Drawing. Application May 6, 1952,
Serial No. 286,431

10 Claims. (Cl. 167—33)

This invention relates to novel substituted succinimides. In particular our invention relates to a novel class of compounds which have utility as pest control agents, chemical intermediates and the like, methods of formulating such compounds, methods of their application, and methods for their manufacture. This application is a continuation-in-part of copending application, Serial No. 192,808, filed October 28, 1950, now abandoned.

The compounds of our invention can be described by the general formula

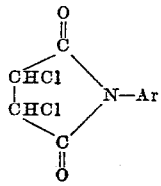

wherein Ar represents an aryl group. Thus, our novel class of compounds can be referred to as N-aryl-$\alpha,\alpha'$-dichlorosuccinimides.

We have found that the grouping (CHClCO)$_2$N— possesses biological activity against a variety of organisms, particularly those classified as fungi. One mode of action appears to be a prevention, or inhibition, of the sporulation of the fungus organism. One preferred embodiment of this fungitoxic grouping is that wherein an aryl group is attached to the imide nitrogen atom.

Thus, the simplest representative, chemically, of the fungitoxic compounds of our invention is N-phenyl-$\alpha,\alpha'$-dichlorosuccinimide. By aryl group we refer to other aromatic radicals in addition to phenyl. Thus, N-aryl-$\alpha,\alpha'$-dichlorosuccinimides include those wherein the imide nitrogen atom is substituted, for example, with naphthyl, phenanthryl, anthracyl, acenaphthyl, chrysyl, pyryl, quinolyl, fluorenyl, indenyl, carbazyl, naphthacyl, phenoxazyl, phenothiazyl, xanthyl, phenazyl, acridyl, indenyl and the like aromatic or aryl groups. Typical among such embodiments of our fungicides are N-($\alpha$-naphthyl)-$\alpha,\alpha'$-dichlorosuccinimide, N-($\beta$-naphthyl)-$\alpha,\alpha'$-dichlorosuccinimide, N-(1 - phenanthryl)-$\alpha,\alpha'$-dichlorosuccinimide, N-(9-phenanthryl)-$\alpha,\alpha'$ - dichlorosuccinimide, N - (1 - acridyl)-$\alpha,\alpha'$-dichlorosuccinimide, N-(3 - acenaphthyl)-$\alpha,\alpha'$-dichlorosuccinimide, N-(5 - acenaphthyl)-$\alpha,\alpha'$-dichlorosuccinimide, N-(3-thianthryl)-$\alpha,\alpha'$-dichlorosuccinimide, N-($\alpha$-quinolyl)-$\alpha,\alpha'$ - dichlorosuccinimide, N-(3 - isoquinolyl)-$\alpha,\alpha'$-dichlorosuccinimde, N-(8-coumaryl)-$\alpha,\alpha'$-dichlorosuccinimide, N-(5-isocoumaryl)-$\alpha,\alpha'$-dichlorosuccinimide, N-(1-naphthacyl)-$\alpha,\alpha'$ - dichlorosuccinimide, N-(4 - carbazyl)-$\alpha,\alpha'$-dichlorosuccinimide and the like. In general we prefer the N-phenyl-, N-($\alpha$-naphthyl)- and N-($\beta$-naphthyl)-embodiments of the N-aryl-$\alpha,\alpha'$-dichlorosuccinimides of our invention because of the greater availability of raw materials for their manufacture, lower cost, and ease of manufacture. However, for certain applications, certain of the more costly and more difficultly prepared materials have advantages in secondary properties, and a greater specificity to the organism under attack to offset the disadvantages.

Furthermore, by substituting other radicals in various positions of the aryl radical we can provide materials of enhanced fungitoxicity or which possess a variety of desirable properties, or a balance of properties for special applications. For example, such considerations as solubility, volatility, phytotoxicity, animal toxicity, compatibility with inert carriers and weathering qualities all must be considered in selecting a fungicide which is commercially acceptable for a given application.

Thus, we can substitute the N-aryl radical with alkyl, alkenyl, alkaryl or other aryl radicals. Typical examples of such substituents include methyl, ethyl, propyl, isopropyl, hexyl, dodecyl, cyclohexyl, phytyl, allyl, butenyl, cyclohexenyl, benzyl or phenyl groups. Typical hydrocarbon-substituted N - aryl-$\alpha,\alpha'$-dichlorosuccinimides of our invention, and which possess outstanding fungicidal activity against a variety of fungus organisms include, for example, N-(o-tolyl)-$\alpha,\alpha'$-dichlorosuccinimide, N-(p-tolyl)-$\alpha,\alpha'$ - dichlorosuccinimide, N-(xylyl)-$\alpha,\alpha'$-dichlorosuccinimide, N-(o - sec. - butylphenyl)-$\alpha,\alpha'$ - dichlorosuccinimide, N-(p - propenylphenyl)-$\alpha,\alpha'$ - dichlorosuccinimide, N-($\alpha$-($\beta$-methylnaphthyl))-$\alpha,\alpha'$ - dichlorosuccinimide, N-(p-diphenyl)-$\alpha,\alpha'$-dichlorosuccinimide, N-(m-cyclohexylphenyl)-$\alpha,\alpha'$-dichlorosuccinimide, N-($\beta$-($\alpha$ - dodecylnaphthyl))-$\alpha,\alpha'$-dichlorosuccinimide, N-(1-(4,5 - dimethylfluorenyl))-$\alpha,\alpha'$-dichlorosuccinimide, N-(4-(6-vinylphenoxazyl))-$\alpha,\alpha'$-dichlorosuccinimide, N-(o - diphenyl)-$\alpha,\alpha'$-dichlorosuccinimide, N-(4-benzylphenyl)-$\alpha,\alpha'$-dichlorosuccinimide, N-(m-vinylphenyl)-$\alpha,\alpha'$-dichlorosuccinimide, N-(p-phytylphenyl)-$\alpha,\alpha'$-dichlorosuccinimide, and N-(o-ter.-butylphenyl)-$\alpha,\alpha'$-dichlorosuccinimide.

We likewise can employ negative radicals as substituents in the N-aryl radical, including the halogens, such as fluorine, chlorine, bromine, and iodine; nitrogen containing groups, such as nitro, amino, substituted amino, nitroso, hydroxylamine and hydrazine; oxygen containing groups, such as hydroxy and O-substituted hydroxy; sulfur containing groups, such as sulfonic acids, salts and esters, mercapto and substituted mercaptans, and sulfides; and carbonyl groups, such as carboxyl, carbalkoxy, acyl and aroyl groups.

Typical ar.-halogen-substituted N-aryl-$\alpha,\alpha'$-dichlorosuccinimides of our invention include N-(o-chlorophenyl)-$\alpha,\alpha'$-dichlorosuccinimide, N - (m - chlorophenyl)-$\alpha,\alpha'$-dichlorosuccinimide, N - (p-chlorophenyl)-$\alpha,\alpha'$-dichlorosuccinimide, N - (2,4 - dichlorophenyl) - $\alpha,\alpha'$-dichlorosuccinimide, N - (2,5-dichlorophenyl)-$\alpha,\alpha'$-dichlorosuccinimide, N - (2,3,4,5 - tetrachlorophenyl)-$\alpha,\alpha'$-dichlorosuccinimide, N-(petachlorophenyl)-$\alpha,\alpha'$-dichlorosuccinimide, N-(2,4,5-trichlorophenyl)-$\alpha,\alpha'$-dichlorosuccinimide, N - (p-bromophenyl)-$\alpha,\alpha'$-dichlorosuccinimide, N - (o - bromophenyl)-$\alpha,\alpha'$-dichlorosuccinimide, N-(2,4-dibromophenyl)-$\alpha,\alpha'$-dichlorosuccinimide, N - (2-chloro-4-bromophenyl)-$\alpha,\alpha'$-dichlorosuccinimide, N - (p-fluorophenyl)-$\alpha,\alpha'$-dichlorosuccinimide, N-(o-iodophenyl)-$\alpha,\alpha'$-dichlorosuccinimide, N-

(2-chloro-4-methylphenyl)-α,α'-dichlorosuccinimide, N-(3,4-dichloro-3,5-dimethyl - 6 - ter.-butylphenyl)-α,α'-dichlorosuccinimide, N-(α(β-chloronaphthyl))-α,α'-dichlorosuccinimide, N - (α - (2-methyl-3,4,5,6-tetrachloronaphthyl))-α,α'-dichlorosuccinimide, N - (9 - (3-bromophenanthryl))-α,α'-dichlorosuccinimide, N-(α-(2-chloro-5,6,7,8-tetrahydronaphthyl))-α,α'-dichlorosuccinimide, N - (6-(1,4-dichlorophenazyl))-α,α'-dichlorosuccinimide and the like.

Among the ar.-nitrogen-substituted N-aryl-α,α'-dichlorosuccinimides of our invention, and which are effective fungistatic agents, illustrative examples include N-(p-nitrophenyl)-α,α'-dichlorosuccinimide, N-(2,4-dinitrophenyl)-α,α'-dichlorosuccinimide, N-(2,4,5-trichloro-3-nitrophenyl)-α,α'-dichlorosuccinimide, N - (o-nitrophenyl)-α,α'-dichlorosuccinimide, N-(α-(5-nitronaphthyl))-α,α'-dichlorosuccinimide, N - (p - aminophenyl) - α,α' - dichlorosuccinimide, N - (p - (N-dimethylaminophenyl))-α,α'-dichlorosuccinimide, N - (p - diethylaminomethylphenyl) - α,α'-dichlorosuccinimide, N - (o - hydroxyaminophenyl)-α,α'-dichlorosuccinimide, N-(p-nitrosophenyl)-α,α'-dichlorosuccinimide, N - (3-amino-4,6-dichlorophenyl)-α,α'-dichlorosuccinimide, N - (p - (N - phenylhydrazophenyl))-α,α'-dichlorosuccinimide, N-(1-(4-nitroxanthyl))-α,α'-dichlorosuccinimide, N-(α-(4-methylaminonaphthyl))-α,α'-dichlorosuccinimide, N - (1(9-nitrosophenanthryl))-α,α'-dichlorosuccinimide, N - (α-(β-nitroquinolyl))-α,α'-dichlorosuccinimide, N-(2-amino-4-butylphenyl)-α,α'-dichlorosuccinimide, N-(2-amino-5-methylphenyl)-α,α'-dichlorosuccinimide, N-(p-(N-butylaminophenyl))-α,α'-dichlorosuccinimide, N - (α-(4-isopropylaminonaphthyl))-α,α'-dichlorosuccinimide, N - (β-(5,6-diaminonaphthyl))-α,α'-dichlorosuccinimide and N - (α-(2-methyl-3-methylaminonaphthyl))-α,α'-dichlorosuccinimide.

The ar.-oxygen-substituted N-aryl-α,α'-dichlorosuccinimides of our invention can be illustrated by the following typical examples of these fungistatic compounds; N-(β-(4-hydroxynaphthyl))-α,α'-dichlorosuccinimide, N-(p-hydroxyphenyl)-α,α'-dichlorosuccinimide, N - (m - hydroxyphenyl)-α,α'-dichlorosuccinimide, N - (o-hydroxyphenyl)-α,α'-dichlorosuccinimide, N - (2,4-dihydroxyphenyl)-α,α'-dichlorosuccinimide, N - (2-hydroxy-3,5-dichlorophenyl)-α,α'-dichlorosuccinimide, N-(2-amino-4-hydroxyphenyl)-α,α'-dichlorosuccinimide, N-(2-(9-hydroxyphenanthryl))-α,α'-dichlorosuccinimide, N - (3 - (7-hydroxy-8-chlorothianthryl))-α,α'-dichlorosuccinimide, N - (1 - (4 - hydroxyacridyl))-α,α'-dichlorosuccinimide, N - (α - (4-hydroxynaphthyl))-α,α'-dichlorosuccinimide, N-(β-(2-hydroxy-4-amino-naphthyl))-α,α'-dichlorosuccinimide, N-(p-anisyl)-α,α'-dichlorosuccinimide, N - (m-anisyl)-α,α'-dichlorosuccinimide, N-(o-phenetyl)-α,α'-dichlorosuccinimide, N-(m-phenetyl)-α,α'-dichlorosuccinimide, N - (p-phenetyl)-α,α'-dichlorosuccinimide, N - (p-lauryloxyphenyl)-α,α'-dichlorosuccinimide, N - (O - butylcresyl) - α,α'-dichlorosuccinimide, N - (α - (β-hydroxyquinolyl))-α,α'-dichlorosuccinimide, N-(p-phenoxyphenyl)-α,α'-dichlorosuccinimide, N-(o-benzyloxyphenyl)-α,α'-dichlorosuccinimide, N-(p-(2',4'-dichlorophenoxyphenyl))-α,α'-dichlorosuccinimide, N-(o - (2',4',5'-trichlorophenoxy - 2,4,5 - trichlorophenyl))-α,α'-dichlorosuccinimide, N-(p-(β-chloroethoxyphenyl))-α,α'-dichlorosuccinimide, N - (2-hydroxy-3-nitrophenyl)-α,α'-dichlorosuccinimide, N - (p-(4-hydrazophenoxyphenyl))-α,α'-dichlorosuccinimide, N-(β-(2-methyl-3-hydroxynaphthyl))-α,α'-dichloro-N-(α-(4,5-dihydroxynaphthyl))-α,α'-dichlorosuccinimide, N - (β - (2-methoxynaphthyl))-α,α'-dichlorosuccinimide, N - (p - (α-naphthoxyphenyl))-α,α'-dichlorosuccinimide, N-(o-(1-acenaphthoxyphenyl))-α,α'-dichlorosuccinimide, N-(m-cyclohexoxyphenyl)-α,α'-dichlorosuccinimide, N-(β-(3-propenyloxynaphthyl))-α,α'-dichlorosuccinimide, and the like.

Among the ar.-sulfur-containing N-aryl-α,α'-dichlorosuccinimides of our invention we include as typical illustrative examples N-(p-mercaptophenyl)-α,α'-dichlorosuccinimide, N - (o-methylmercaptophenyl)-α,α'-dichlorosuccinimide, N - (α-(2-mercaptonaphthyl))-α,α'-dichlorosuccinimide, N - (o-trichloromethylmercaptophenyl)-α,α'-dichlorosuccinimide, N-(α-(β-amylmercaptoquinolyl))-α,α'-dichlorosuccinimide, N - (p-taurylphenyl-α,α'-dichlorosuccinimide, N - (m-sulfophenyl) - α,α'- dichlorosuccinimide, sodium salt of N-(p-sulfophenyl)-α,α'-dichlorosuccinimide, N - (α-(2-sulfaminonaphthyl))-α,α'-dichlorosuccinimide, N-(p-sulfophenyl)-α,α'-dichlorosuccinimide methyl ester, N-(1-(9-sulfinophenanthryl))-α,α'-dichlorosuccinimide, N - (p - thiocyanophenyl) - α,α'-dichlorosuccinimide, N - (2-chloro - 4 - sulfophenyl)α,α'-dichlorosuccinimide, N - (3 - sulfo - 5 - nitrophenyl)-α,α'-dichlorosuccinimide, N - (2,4,5 - trichloro-3-trichloromethylmercapto)-α,α'-dichlorosuccinimide, N - (2'-chlorophenoxy - 2 - mercaptophenyl) - α,α' - dichlorosuccinimide, N - (2 - methylamino-3-thiocyano - 5,6 - dimethylphenyl) - α,α'-dichlorosuccinimide, and the like.

Among those embodiments of the compounds of our invention wherein the N-aryl group is substituted with carbonyl groups we include, as illustrative examples, N-(p-carboxyphenyl)-α,α'-dichlorosuccinimide, sodium salt of N-(p-carboxyphenyl)-α,α'-dichlorosuccinimide, butyl ester of N-(p-carboxyphenyl)-α,α'-dichlorosuccinimide, N-(o-acetophenyl) - α,α' - dichlorosuccinimide, N-(p-(2-chloropropiophenyl))-α,α'-dichlorosuccinimide, N-(o-benzoylphenyl) - α,α' - dichlorosuccinimide, N-(2-benzoyl-4-chlorophenyl)-α,α'-dichlorosuccinimide, N-(α-(2-carboxynaphthyl))-α,α' - dichlorosuccinimide, N-(1-(4-carboxyphenanthryl))-α,α'-dichlorosuccinimide, butoxy ethoxy propyl ester of N-(p-carboxyphenyl)-α,α'-dichlorosuccinimide, isopropyl ester of N-(p-carboxyphenyl)-α,α'-dichlorosuccinimide, N - (8-(7-carboxycoumaryl))-α,α'-dichlorosuccinimide, N-(2-amino - 4-carboxyphenyl)-α,α'-dichlorosuccinimide, and the like.

The compounds of our invention can be considered as being the condensation products of α,α'-dichlorosuccinic anhydride and a primary arylamine. However, we have discovered that the preparation of our compounds requires two steps, wherein an N-aryl-α,α'-dichlorosuccinamic acid is first formed by treating a primary arylamine with α,α'-dichlorosuccinic anhydride, and then effecting an inner condensation of the N-aryl-α,α'-dichlorosuccinamic acid to produce the N-aryl-α,α'-dichlorosuccinimide. However, the agents previously employed for effecting such inner condensation with, for example, succinamic acids and maleamic acids are not suitable for the manufacture of the α,α'-dichlorosuccinimides of our invention. Typical of these agents are a mixture of an anhydride of a fatty acid and the anhydrous alkali metal salt thereof, or acid halides of organic acids. For example, when an N-aryl-α,α'-dichlorosuccinamic acid is treated with acetyl chloride, or a mixture of sodium acetate and acetic anhydride, or by direct heating in an inert solvent, the N-aryl-α,α'-dichlorosuccinamic acid decomposes with the liberation of hydrogen chloride and the formation of tarry products, from which we were unable to separate the desired N-aryl-α,α'-dichlorosuccinimide.

To effect the inner condensation of the N-aryl-α,α'-dichlorosuccinamic acid to the desired N-aryl-α,α'-dichlorosuccinimide, we employ the halides of inorganic acids. Among such condensing agents we have found that thionyl chloride is particularly effective. Other chlorides of the sulfur acids, including for example the sulfur chlorides, as well as the chlorides of phosphorus, such as phosphorus trichloride, phosphorus pentachloride and the phosphorus oxychlorides are likewise suitable. We can employ these condensing agents directly or in solution. One method of effecting the inner condensation comprises dissolving the succinamic acid in a solvent such as benzene, toluene, acetone, xylene, methylethyl ketone and the like and treating this solution with the acid halide of the inorganic acid, or we can employ both the succinamic acid and the condensing agent in solution. In general if we employ a solvent which is miscible with water, we prefer to destroy the excess acid halide with water thus precipitating the N-aryl-α,α'-dichlorosuccinimide which is thereupon recovered by filtration or other conventional means. An alternative method is to employ a water immiscible solvent, concentration of the reaction mixture by distillation of the excess solvent, and removal of the precipitated imide by filtration, centrifugation and the like.

The inner condensation of the N-aryl-α,α'-dichlorosuccinamic acid with an acid halide of an inorganic acid is usually accompanied by the evolution of heat. This evolution can be either controlled by externally cooling the reaction mixture or permitting the heat to be removed by evaporative cooling such as conducting the reaction under reflux. In general we prefer to employ temperatures between about —20° C. and +60° C. although the temperature is not critical and in certain operations temperatures above or below these limits can be employed.

In order to obtain a high yield based on the succinamic acid we employ ordinarily at least a molar equivalent of the acid halide of the inorganic acid. However, if the other constituents of the succinamic acid are inert to the condensing agent, a substantial excess can be employed. Conversely we can employ less than a molar equivalent when such is considered desirable but in such event, of course, the yield based upon the succinamic acid suffers.

In the following detailed examples of the production of typical embodiments of the compounds of our invention all parts and percentages are by weight.

EXAMPLE I $N$ - phenyl - $\alpha,\alpha'$ - dichlorosuccinimide.—In a vessel equipped with an agitator, means for simple distillation or returning of reflux liquid, and heat transfer means was placed 118.3 parts, comprising a mixture of meso and dl modifications of α,α'-dichlorosuccinic anhydride in 400 parts of benzene. To this stirred solution was added a solution consisting of 65 parts of aniline in 80 parts of benzene over a period of 3 minutes. During this addition the temperature of the reaction mixture increased from 25° C. to 35° C. After addition was complete, N-phenyl-α,α'-dichlorosuccinamic acid separated as a copious white mass. This product was recovered by filtration, washed with benzene and dried. The yield of product melting at 115 to 118° C. was 99 per cent. This product, 40 parts, was added to a vessel equipped with an agitator, reflux apparatus, heat transfer means and an outlet for removing gaseous by-product, and treated with 159 parts of thionyl chloride, and stirring was continued for 15 minutes at 25° C. and atmospheric pressure. The mixture was thereupon heated at reflux a period of two hours. The excess thionyl chloride was destroyed with a mixture of ice and water. The product which separated was recovered by filtration, washed with 10 per cent sodium bicarbonate solution, and with water. The product was a mixture of stereoisomers melting at 169 to 180° C. amounting to a yield of 99 per cent. Recrystallization of a portion from ethanol produced the dl modification as colorless needles, M. P. 195.5 to 200° C., containing 29.2 per cent chlorine. The formula $C_{10}H_7O_2NCl_2$ requires 29.1 per cent chlorine.

EXAMPLE II $N$-(p-chlorophenyl) - $\alpha,\alpha'$- dichlorosuccinimide.—By a procedure similar to Example I, 100 parts of α,α'-dichlorosuccinic anhydride in 800 parts of benzene was treated with 75.5 parts of p-chloroaniline in 400 parts of benzene. The product, N-(p-chlorophenyl)-α,α'-dichlorosuccinamic, acid was produced as yellow crystals in a yield of 95 per cent and having a melting point of 149° C. to 150° C. with decomposition. This mixture of stereoisomeric forms was treated with thionyl chloride as in the foregoing example to produce a 90 per cent yield of N-(p-chlorophenyl)-α,α'-dichlorosuccinimide having a melting point of 200 to 203° C. and containing 37.8 per cent chlorine. The chlorine requirement for the formula $C_{10}H_6O_2NCl_3$ is 38.2 per cent.

EXAMPLE III $N$-(2,5-dichlorophenyl)-$\alpha,\alpha'$-dichlorosuccinimide.—Reaction of 30.4 parts of α,α'-dichlorosuccinic anhydride with 30 parts of 2,5-dichloroaniline in benzene solution according to the procedure of Example I gave a quantitative yield of N-(2,5-dichlorophenyl)-α,α'-succinamic acid, M. P. 177–178° C. Inner condensation with thionyl chloride as in Example I gave the N-(2,5-dichlorophenyl)-α,α'-dichlorosuccinimide in 92 per cent yield, having a melting point of 200 to 203.5° C. and 44.9 per cent chlorine. The formula $C_{10}H_5O_2NCl_4$ requires 45.3 per cent chlorine.

EXAMPLE IV $N$-(p-tolyl) - $\alpha,\alpha'$ - dichlorosuccinimide.—Following the procedure of Example I, N-(p-tolyl)-α,α'-dichlorosuccinamic acid, M. P. 119–127° C. dec. was prepared in 94 per cent yield from p-toluidine and α,α'-dichlorosuccinic anhydride. Inner condensation produced N-(p-tolyl)-α,α'-dichlorosuccinimide as white crystals in 80.5 per cent yield. The product melted at 194 to 195° C., and contained 27.6 per cent chlorine. The formula $C_{11}H_9O_2NCl_2$ requires 27.5 per cent chlorine.

EXAMPLE V $N$ - (p - diphenyl) - $\alpha,\alpha'$ - dichlorosuccinimide.—Corresponding succinamic acid, prepared by the procedure of Example I from 4-aminodiphenyl and α,α'-dichlorosuccinic anhydride, in 98 per cent yield had a melting point of 215 to 220° C. with decomposition. Inner condensation produced N-(p-diphenyl)-α,α'-dichlorosuccinimide in 90 per cent yield. The pure product melted at 231 to 233° C. and contained 22.0 per cent chlorine. The formula $C_{16}H_{11}O_2NCl_2$ requires 22.1 per cent chlorine.

As a further modification Example VI is presented.

EXAMPLE VI $N$-(p-nitrophenyl)-$\alpha,\alpha'$-dichlorosuccinimide.—In the reaction vessel of Example I was placed 100 parts of α,α'-dichlorosuccinic anhydride and 550 parts of benzene. To this stirred solution was added a solution consisting of 81.5 parts of p-nitroaniline and 300 parts of acetone over a period of fifteen minutes. During this addition the temperature of the reaction mixture increased from 25 to 35° C. After addition, 300 parts of the solvent mixture was removed by distillation and the resultant slurry was cooled to a temperature of 25° C. Yellow crystals of N-(p-nitrophenyl)-α,α'-dichlorosuccinamic acid separated. This product was treated according to the process of Example I to produce the corresponding N-(p-nitrophenyl)-α,α'-dichlorosuccinimide having a melting point of 208 to 210° C. with decomposition. The chlorine content of the product was 24.5 per cent while the formula

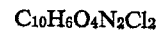

$$C_{10}H_6O_4N_2Cl_2$$

requires 24.6 per cent chlorine.

The N-aryl-α,α'-dichlorosuccinimides of our invention can exist in the form of meso and dl stereoisomers. We have found that as fungicidal agents each form is suitable. As noted the meso and dl forms can be separated by crystallization. The resolution of the dl mixture can be accomplished by methods well known in the art.

Other arylamines can be employed to produce the compounds of our invention by methods similar to the above examples. Thus, we can treat o-toluidine, N,N-dimethylphenylenediamine, 2,4-dichloroaniline, 2-chloro-3-fluoro-4-nitroaniline, p-anisidine, α-naphthylamine, 2-amino-6-nitronaphthalene, β-anthramine, 2-aminodiphenyl, ethyl anthranilate, p-aminophenol, m-aminoacetophenone, p-aminobenzophenone, and p-aminothiophenol with the α,α'-dichlorosuccinic anhydride followed by inner condensation of the intermediate product by either of the methods described heretofore. Thus, for example, we thereby obtain, respectively, N-(o-tolyl)-α,α'-dichlorosuccinimide, N-(p-dimethylaminophenyl) - α, α' - dichlorosuccinimide, N-(2,4-dichlorophenyl) - α,α' - dichlorosuccinimide, N-(2-chloro-3-fluoro-4-nitrophenyl)-α, α' - dichlorosuccinimide, N-(p-anisyl)-α,α'-dichlorosuccinimide, N - (α - naphthyl)-α,α-dichlorosuccinimide, N-(β-(6-nitronaphthyl))-α,α'-dichlorosuccinimide, N - (β-anthryl)-α,α'-dichlorosuccinimide, N-(4-xenyl)-α,α'-dichlorosuccinimide, N-(2-carbethoxyphenyl)-α,α'-dichlorosuccinimide, N-(4-hydroxyphenyl)-α,α' - dichlorosuccinimide, N-(3-acetylphenyl)-α,α'-dichlorosuccinimide, N-(4-benzoylphenyl)-α,α'-dichlorosuccinimide, and N-(4-mercaptophenyl)-α,α'-dichlorosuccinimide.

In order to obtain practical benefit from the inherent fungicidal activity of our N-aryl-α,α'-dichlorosuccinimides we prefer to employ our material in formulations with relatively inert, surface-contacting agents, diluents, extenders or adjuvants. For example, in order to protect most effectively a surface such as a painted or wood surface, or the surface of a fruit, stem or leaf, or a concrete or other surface, we thereby apply our material in intimate contact with, but thoroughly dispersed on, the surface thereof. Likewise, in treating more or less porous material such as cloth, felted textiles and woven fibers, it is important that our fungicide be interspersed between the fine structure of such materials and be in intimate contact therewith. Furthermore, such surface-contacting agents have the effect of requiring only minute quantities of N-aryl-α,α'-dichlorosuccinimide to obtain effective protection. A further advantage of so extending our materials is to permit field application by methods readily employed and still obtain effectively complete coverage of the material being protected.

One method of applying our N-aryl-α,α'-dichloro-succinimides is in the form of a water suspension. In such suspensions we prefer to include a surface-active agent in sufficient amount to disperse and suspend the fungicidal agent. Examples of such surface-active agents which can be employed in forming such dispersions include salts of the alkyl and alkylaryl sulfonates, such as du Pont MP-189 and Nacconol-NR, alkyl sulfates, such as dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples Non-Ionic-218. Still other surface-active agents can be employed, the above merely showing a representative list of the more common materials.

In the examples of our fungicidal compositions which follow all parts are parts by weight.

EXAMPLE VII

A formulation of N-phenyl-α,α'-dichlorosuccinimide was prepared by finely grinding 10 parts of this material and adding the resulting powder to 1000 parts of water containing one part of Tween-80 with vigorous agitation. This concentrate dispersion was further diluted 1000 times by the addition of water to obtain a formulation of suitable concentration for application. Thus the resulting dispersion contained 10 p. p. m. of our fungicide in the water dispersion. It was found to have excellent fungicidal properties when applied to tomato, corn, and bean plants by spraying or dipping. In a similar manner we prepared aqueous dispersions at concentrations of 0.1, 1.0, 10 and 100 p. p. m. of our fungicide and in each instance these compositions possessed exceptionally good fungicidal properties. Similar dispersions of other N-aryl-α,α'-dichlorosuccinimides are equally effective.

The solubility of N-aryl-α,α'-dichlorosuccinimides in organic solvents, furthermore, is such that they can be applied advantageously in the form of solution in this type of solvent, and for certain uses this method of application is preferred. For example, in treating cloth, leather or other fibrous articles we prefer to apply our fungicides dissolved in a volatile solvent. After application the volatile solvent evaporates, leaving the fungicidal agent impregnated throughout the surface of the article and in the dispersed form which we have found to be most advantageous. Likewise, in applying our fungicide to smooth surfaces, as for example in treating wood surfaces for protection against fungus attack, or to inhibit fungus growths on damp concrete surfaces, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for our active agents we use hydrocarbons, such as benzene, xylene or toluene; ketones, such as acetone, methylethyl ketone and cyclohexanone; chlorinated solvents, such as carbon tetrachloride, trichloro- and perchloroethylene; esters, such as ethyl, butyl and amyl acetates; and alcohols, such as ethanol, isopropanol, and amyl alcohols. Other solvents which we employ are the Carbitols and Cellosolves, the former comprising in general the monalkyl ethers of diethylene glycol and the latter the monoalkyl ethers of ethyleen glycol. In addition, combinations of these various typical solvents can be employed whereby special volatility and viscosity characteristics can be imparted to our formulations.

EXAMPLE VIII

A solution consisting of 5 parts of N-(p-diphenyl)-α,α'-dichlorosuccinimide in 250 parts of cyclohexanone was prepared by stirring the two constituents for a period of fifteen minutes at a temperature of about 25° C. This concentrated solution, suitable for storage or transportation, was further diluted with 99,750 parts of kerosene to form a final dilution of 50 p. p. m. suitable for application and having excellent fungicidal activity.

Similarly concentrated solutions of N-(p-nitrophenyl)-α,α' - dichlorosuccinimide, N - (p - chlorophenyl) - α,α'-dichlorosuccinimide, N-(p-hydroxyphenyl)-α,α'-dichlorosuccinimide, N-(α-(β-methylnaphthyl))-α,α'-dichlorosuccinimide, N-(9-(2-chlorophenanthyl))-α,α'-dichlorosuccinimide, N-(4-mercaptophenyl)-α,α'-dichlorosuccinimide, N - (o - anisyl)-α,α'-dichlorosuccinimide, N-(α-quinolyl)-α,α'-dichlorosuccinimide, and N-(phenyl)-α,α'-dichlorosuccinimide, are prepared in each of the following typical solvents, ethyl acetate, kerosene, perchloroethylene and Cellosolve, and final dilutions for application are prepared by the addition of further quantities of kerosene with equally good results. The final products protect surfaces to which they are applied from fungus growths for extended periods of time.

In addition to the above-described methods of wet application of our N-aryl-α,α'-dichlorosuccinimides, we can prepare compositions in which our material is extended in talc, clay, cellulosic powders or other solid diluents. Such formulations have particular utility in the treatment of seeds, wherein an aqueous application may promote premature germination, or where a solvent application may damage the seed. For certain field crop applications we also prefer a dust formulation wherein a wet application might introduce certain secondary effects which are undesirable. Further specific examples of such typical inert solid carriers which can be employed as diluents in our dust formulations include fuller's earth, pyrophillite, bentonite, montmorillonite, Attaclay, the Filtrols, Celite and the like.

EXAMPLE IX

A typical dust formulation of our fungicides is prepared as follows: Equal parts of the N-aryl-α,α'-dichlorosuccinimide and fuller's earth were placed in a hammer mill. This mixture was milled for a period of one hour and screened to collect a fraction passing a 325-mesh sieve. This fifty per cent by weight formulation is stable and can be stored and shipped as such. A further dilution was made for application by milling two parts of the above formulation with an additional 98 parts of fuller's earth. Products so produced from a wide variety of our materials have excellent fungicidal properties.

For certain applications we prefer to employ our fungicide in the form of oil-in-water emulsions. Thus, a concentrate of the fungicidal agent is prepared in a water-insoluble solvent and this solution is then dispersed or emulsified in water containing a surface-active agent. Typical examples of such solvents include hydrocarbons, such as kerosene, benzene or naptha, higher alcohols, such as butanol, oleyl alcohol or ethers and esters thereof, and chlorinated solvents, such as perchloroethylene, and trichloroethylene.

EXAMPLE X

An oil-in-water emulsion was prepared by dissolving 10 parts of N-(p-nitrophenyl)-$\alpha,\alpha'$-dichlorosuccinimide in 1000 parts of kerosene. This solution was dispersed with vigorous agitation in 99,000 parts of water containing 5 parts of Triton X-100, to provide a dispersion containing 10 p. p. m. of active agent which had excellent fungicidal properties.

When similar solutions of N-(2,5-dichlorophenyl)-$\alpha,\alpha'$-dichlorosuccinimide, N - (pentachlorophenyl) - $\alpha,\alpha'$ - dichlorosuccinimide, N - ($\beta$ - naphthyl) - $\alpha,\alpha'$ - dichlorosuccinimide, N-(o-tolyl)-$\alpha,\alpha'$-dichlorosuccinimide, N-(2-hydroxy-4-aminophenyl)-$\alpha,\alpha'$-dichlorosuccinimide, N-(4-acridyl)-$\alpha,\alpha'$-dichlorosuccinimide, and the like, are prepared in kerosene, naphtha and trichloroethylene followed by dispersion in water equally satisfactory emulsions having excellent fungicidal properties, are obtained. Further, we have discovered that it is possible to employ a combination of the above methods of application of our fungicide. Thus, we can incorporate a surface-active agent in our dust formulations to provide a wettable powder, which can then be suspended in an aqueous or other liquid medium. Of particular utility for such formulations are the alkyl or alkylaryl sulfonate detergents.

EXAMPLE XI

A mixture of 100 parts of N-phenyl-$\alpha,\alpha'$-dichlorosuccinimide, 1000 parts of Attaclay and 0.1 part of Nacconol was milled through a hammer mill and the resulting powder sieved to pass a 100-mesh screen. This 10 per cent wettable power produced a satisfactory water suspension having good fungicidal properties when 11 parts were stirred into 10,000 parts of water to produce a suspension containing 100 p. p. m. active ingredient. Similar wettable powders with Filtrol, fuller's earth and pyrophyllite are prepared by milling our N-aryl-$\alpha,\alpha'$-dichlorosuccinimides as above with Tween-80 followed by screening. In each instance they possessed excellent fungicidal properties.

Likewise, a solvent formulation can be employed along with water, or water and a surface-active agent. Such surface-active agents are chosen, for example, from the types represented by Triton X-100, Sharples Non-Ionic-218 or Tween.

EXAMPLE XII

A solution of 100 parts of N-(p-tolyl)-$\alpha,\alpha'$-dichlorosuccinimide, 100 parts of ethyl acetate and 5 parts of Tween-20 was prepared by stirring the ingredients at 25° C. for one-half hour. This solution was then added with agitation to 9,395 parts of water to provide a good fungicidal dispersion suitable for application.

Equally good dispersions having excellent fungicidal properties are obtained when our materials are dissolved in methanol, acetone, or methyl ethyl ketone along with Triton X-100 and added with agitation to water.

In addition, we have found that we can incorporate an adherent or sticking agent such as vegetable oils, naturally occurring gums, and other adhesives in our formulations. Likewise, we can employ humectants in our formulations. Furthermore, these formulations can be employed in admixture with other fungicidal materials or other biocides such as insecticides, larvicides, bactericides, vermicides, miticides, or with other materials which it is desired to apply along with our fungicide, such as for example herbicides or fertilizers.

Of particular importance in the treatment of agricultural crops against fungus diseases is the susceptibility of the plant to damage by the fungitoxicant employed. Our materials are particularly advantageous in this respect since in a variety of tests we have found no evidence that our materials are toxic to plants or inhibit the normal functioning of the plant or the germination of seeds. We have demonstrated the innocuous nature of our fungitoxicant formulations by dipping the entire leaf of each corn, soybean, tomato, cumber and cotton plants in suspensions of our fungicides at concentrations as high as 10,000 p. p. m. and have observed no adverse effect on the so-treated plants or upon the leaves which were dipped. Furthermore, each of these plants was totally sprayed with dispersions of our fungicides in water at a concentration of 10,000 p. p. m. without any deleterious effect on the plant. Even when our fungicides are applied as a lanolin paste to the stem of young plants of the above species no adverse effects were noted.

The effectiveness of our fungicides in protecting growing plants from fungus diseases has been demonstrated by control of the Tomato Early Blight and Tomato Late Blight.

EXAMPLE XIII

This test involves spraying the test plants with the fungicide, inoculation with spores of the fungus responsible for the disease, and determination of the number of disease lesions which develop. Bonny Best Tomato plants grown in three-inch pots to a height of 4–7 inches were used as host plants. Three replicate plants were used for each determination. Spray suspensions equivalent to those of Example VII were made up in 0.01 per cent Tween-20 solutions. The tomato plants were sprayed on a revolving turntable with the fungicide suspension by means of a De Vilbiss paint spray gun at different concentrations of active ingredient. Each turntable load of plants was sprayed with 85 cc. of spray suspension. No appreciable loss of fungicide from the plants because of run-off occurs under these conditions. After the fungicide deposite was allowed to dry, the plants were inoculated with a spore suspension of the test fungus. The spores were obtained from fungus cultures grown on salt-potato-dextrose-agar at 20° C. for 7–14 days. Twenty cc. of a suspension containing 50,000 spores per cc. was used to inoculate each turntable load of plants. The spores were sprayed under an air pressure of 10 p. s. i. by means of a De Vilbiss atomizer held about one foot from the plants. Both the upper and lower leaf surfaces were uniformly inoculated by this method. Following inoculation, the plants were placed in an infection chamber which was maintained at 20° C. and 100 per cent relative humidity. After 40–48 hours in this incubation chamber, the plants were removed to a greenhouse bench. Lesions usually developed 3 to 4 days after inoculation. The total number of lesions on three compound leaves of each sprayed plant were determined. Leaves having the same position on the plant were counted for all treatments and the controls. The typical data in the table indicate the control of these diseases which can be achieved with our fungicides. In each example the per cent control, compared to the untreated, infested plants, is given as well as the concentration of fungicide required to achieve 95 per cent control of the disease (ED 95).

Table
CONTROL OF EARLY AND LATE BLIGHT OF TOMATO, PERCENT CONTROL

| Material | Concentration, p. p. m. | | | | Concentration, p. p. m. | | | |
|---|---|---|---|---|---|---|---|---|
| | 400 | 80 | 16 | ED95 | 2,000 | 400 | 80 | ED95 |
| N-(Phenyl)-α,α'-dichlorosuccinimide | 100 | 92 | | 110 | 100 | 100 | 99 | 100 |
| N-(p-Chlorophenyl)-α,α'-dichlorosuccinimide | 100 | 99 | 47 | 50 | 99 | 99 | 99 | 50 |
| N-(2,5-Dichlorophenyl)-α,α'-dichlorosuccinimide | 96 | 49 | 46 | | 100 | 100 | 46 | |
| N-(p-Diphenyl)-α,α'-dichlorosuccinimide | 99 | | | | 79 | | | |
| N-(p-Tolyl)-α,α'-dichlorosuccinimide | 77 | | | | 100 | 99 | 79 | 200 |

From these and numerous other determinations we have found that fungicidal activity is inherent in the chemical grouping $(CHClCO)_2NAr$, wherein Ar is aryl.

Further indication of the fungicidal activity possessed by the α,α'-dichlorosuccinimide group is determined by establishing the extent of control against the Early and Late Blights of tomato as in the above tabular enumeration. For example in the form of aqueous dispersions prepared according to Example VII the following typical fungicidal succinimides of our invention give effective control: N-(α-naphthyl)-α,α'-dichlorosuccinimide, N-(β-naphthyl)-α,α'-dichlorosuccinimide, N-(9-phenanthryl)-α,α'-dichlorosuccinimide, N-(3-thianthryl)-α,α'-dichlorosuccinimide, N-(α-quinolyl)-α,α'-dichlorosuccinimide, N-(4-carbazyl)-α,α'-dichlorosuccinimide, N-(o-tolyl)-α,α'-dichlorosuccinimide, N-(o-sec.-butylphenyl)-α,α'-dichlorosuccinimide, N-(m-cyclohexylphenyl)-α,α'-dichlorosuccinimide, N-(β-(α-dodecylnaphthyl))-α,α'-dichlorosuccinimide, N-(4-(6-vinylphenoxazyl))-α,α'-dichlorosuccinimide, N-(2,4-dichlorophenyl)-α,α'-dichlorosuccinimide, N-(pentachlorophenyl)-α,α'-dichlorosuccinimide, N-(2-chloro-4-bromophenyl)-α,α'-dichlorosuccinimide, N-(α-(2-methyl-3,4,5,6-tetrachloronaphthyl))-α,α'-dichlorosuccinimide, N-(α-(2-chloro-5,6,7,8-tetrahydronaphthyl))-α,α'-dichlorosuccinimide, N-(p-aminophenyl)-α,α'-dichlorosuccinimide, N-(p-diethylaminomethylphenyl)-α,α'-dichlorosuccinimide, N-(3-amino-4,6-dichlorophenyl)-α,α'-dichlorosuccinimide, N-(1-(9-nitrosophenanthryl))-α,α'-dichlorosuccinimide, N-(2-amino-5-methylphenyl)-α,α'-dichlorosuccinimide, N-(β-(4-hydroxynaphthyl))-α,α'-dichlorosuccinimide, N-(3-(7-hydroxy-8-chlorothianthryl))-α,α'-dichlorosuccinimide, N-(o-phenetyl)-α,α'-dichlorosuccinimide, N-(p-lauryloxyphenyl)-α,α'-dichlorosuccinimide, N-(p-phenoxyphenyl)-α,α'-dichlorosuccinimide, N-(p-mercaptophenyl)-α,α'-dichlorosuccinimide, N-(α-(β-amylmercaptoquinolyl))-α,α'-dichlorosuccinimide, sodium salt of N-(p-sulfophenyl)-α,α'-dichlorosuccinimide, N-(2-chloro-4-sulfophenyl)-α,α'-dichlorosuccinimide, butyl ester of N-(p-carboxyphenyl)-α,α'-dichlorosuccinimide, N-(p-(2-chloropropiophenyl))-α,α'-dichlorosuccinimide, N-(1-(4-carboxyphenanthryl))-α,α'-dichlorosuccinimide, isopropyl ester of N-(p-carboxyphenyl)-α,α'-dichlorosuccinimide and N-(2-amino-4-carboxyphenyl)-α,α'-dichlorosuccinimide.

Similarly when formulated as dusts in accordance with Example IX the following typical succinimides give effective control: N-(1-phenanthryl)-α,α'-dichlorosuccinimide, N-(1-acridyl)-α,α'-dichlorosuccinimide, N-(5-acenaphthyl)-α,α'-dichlorosuccinimide, N-(3-thianthryl)-α,α'-dichlorosuccinimide, N-(α-quinolyl)-α,α'-dichlorosuccinimide, N-(o-tolyl)-α,α'-dichlorosuccinimide, N-(o-sec.-butylphenyl)-α,α'-dichlorosuccinimide, N-(p-propenylphenyl)-α,α'-dichlorosuccinimide, N-(β-(α-dodecylnaphthyl))-α,α'-dichlorosuccinimide, N-(2,4-dichlorophenyl)-α,α'-dichlorosuccinimide, N-(2,5-dichlorophenyl)-α,α'-dichlorosuccinimide, N-(2,4,5-trichlorophenyl)-α,α'-dichlorosuccinimide, N-(o-bromophenyl)-α,α'-dichlorosuccinimide, N-(α-(2-methyl-3,4,5,6-tetrachloronaphthyl))-α,α'-dichlorosuccinimide, N-(2,4-dinitrophenyl)-α,α'-dichlorosuccinimide, N-(2,4,5-trichloro-3-nitrophenyl)-α,α'-dichlorosuccinimide, N-(p-diethylaminomethylphenyl)-α,α'-dichlorosuccinimide, N-(1-(9-nitrosophenanthryl))-α,α'-dichlorosuccinimide, N-(α-(4-isopropylaminonaphthyl))-α,α'-dichlorosuccinimide, N-(p-hydroxyphenyl)-α,α'-dichlorosuccinimide, N-(3-(7-hydroxy-8-chlorothianthryl))-α,α'-dichlorosuccinimide, N-(p-(2',4'-dichlorophenoxyphenyl))-α,α'-dichlorosuccinimide, N-(β-(2-methyl-3-hydroxynaphthyl))-α,α'-dichlorosuccinimide, N-(p-taurylphenyl)-α,α'-dichlorosuccinimide, N-(α-(β-amylmercaptoquinolyl))-α,α'-dichlorosuccinimide, N-(m-sulfophenyl)-α,α'-dichlorosuccinimide, N-(α-(2-sulfaminonaphthyl))-α,α'-dichlorosuccinimide, N-(2-chloro-4-sulfophenyl)-α,α'-dichlorosuccinimide, sodium salt of N-(p-carboxyphenyl)-α,α'-dichlorosuccinimide, butyl ester of N-(p-carboxyphenyl)-α,α'-dichlorosuccinimide, N-(o-acetophenyl)-α,α'-dichlorosuccinimide, N-(1-(4-carboxyphenanthryl))-α,α'-dichlorosuccinimide and N-(8-(7-carboxycoumaryl))-α,α'-dichlorosuccinimide.

As wettable powders, effective control in a preferred medium for widespread agricultural use is obtained. Typical formulations prepared as in Example XI of the following N-aryl-α,α'-dichlorosuccinimides are suitable: N-(1-phenanthryl)-α,α'-dichlorosuccinimide, N-(3-isoquinolyl)-α,α'-dichlorosuccinimide, N-(1-naphthacyl)-α,α'-dichlorosuccinimide, N-(o-tolyl)-α,α'-dichlorosuccinimide, N-(xylyl)-α,α'-dichlorosuccinimide, N-(p-propenylphenyl)-α,α'-dichlorosuccinimide, N-(α-(β-methylnaphthyl))-α,α'-dichlorosuccinimide, N-(4-(6-vinylphenoxyazyl))-α,α'-dichlorosuccinimide, N-(2,5-dichlorophenyl)-α,α'-dichlorosuccinimide, N-(pentachlorophenyl)-α,α'-dichlorosuccinimide, N-(o-bromophenyl)-α,α'-dichlorosuccinimide, N-(2-chloro-4-methylphenyl)-α,α'-dichlorosuccinimide, N-(2,4,5-trichloro-3-nitrophenyl)-α,α'-dichlorosuccinimide, N-(p-aminophenyl)-α,α'-dichlorosuccinimide, N-(α-(β-nitroquinolyl))-α,α'-dichlorosuccinimide, N-(2-amino-5-methylphenyl)-α,α'-dichlorosuccinimide, N-(β-(4-hydroxynaphthyl))-α,α'-dichlorosuccinimide, N-(m-hydroxyphenyl)-α,α'-dichlorosuccinimide, N-(p-lauryloxyphenyl)-α,α'-dichlorosuccinimide, N-(p-phenoxyphenyl)-α,α'-dichlorosuccinimide, N-(β-(2-methyl-3-hydroxynaphthyl))-α,α'-dichlorosuccinimide, N-(p-mercaptophenyl)-α,α'-dichlorosuccinimide, N-(m-sulfophenyl)-α,α'-dichlorosuccinimide, N-(1-(9-sulfinophenanthryl))-α,α'-dichlorosuccinimide, N-(3-sulfo-5-nitrophenyl)-α,α'-dichlorosuccinimide, N-(2'-chlorophenoxy-2-mercaptophenyl)-α,α'-dichlorosuccinimide, N-(o-acetophenyl)-α,α'-dichlorosuccinimide, N-(p-(2-chloropropiophenyl))-α,α'-dichlorosuccinimide, N-(α-(2-carboxynaphthyl))-α,α'-dichlorosuccinimide, isopropyl ester of N-(p-carboxyphenyl)-α,α'-dichlorosuccinimide and N-(2-amino-4-carboxyphenyl)-α,α'-dichlorosuccinimide.

Likewise as determined by the control of the Blight of tomato, a wide variety of solvent-water formulations give effective control of fungus attack on agricultural crops. Such solvent-water formulations prepared, for example, as in Example XII of the following typical materials give good control: N-(α-naphthyl)-α,α'-dichlorosuccinimide, N-(β-naphthyl)-α,α'-dichlorosuccinimide, N-(3-isoquinolyl)-α,α'-dichlorosuccinimide, N-(1-naphthacyl)-α,α'-dichlorosuccinimide, N-(xylyl)-α,α'-dichlorosuccinimide, N-(α-(β-methylnaphthyl))-α,α'-dichlorosuccinimide, N-(p-diphenyl)-α,α'-dichlorosuccinimide, N-(o-diphenyl)-α,α' - dichlorosuccinimide, N - (4-benzylphenyl)-α,α'-dichlorosuccinimide, N-(m-vinylphenyl)-α,α'-dichlorosuccinimide, N-(2,4,5-trichlorophenyl)-α,α'-dichlorosuccinimide, N - (2-chloro-4-bromophenyl)-α,α'-dichlorosuccinimide, N-(p-fluorophenyl)-α,α'-dichlorosuccinimide, N-(2-chloro-4-methylphenyl)-α,α'-dichlorosuccinimide, N-(α-(2-chloro-5,6,7,8-tetrahydronaphthyl)) - α,α'-dichlorosuccinimide, N-(2,4-dinitrophenyl)-α,α'-dichlorosuccinimide, N-(o-hydroxyaminophenyl) - α,α' - dichlorosuccinimide, N-(3-amino-4,6-dichlorophenyl)-α,α'-dichlorosuccinimide, N - (α - (4 - methylaminonaphthyl))-α,α'-dichlorosuccinimide, N-(p-hydroxyphenyl)-α,α'-dichlorosuccinimide, N-(m-hydroxyphenyl) - α,α' - dichlorosuccinimide, N-(o-phenetyl)-α,α'-dichlorosuccinimide, N-(p-(2',4'-dichlorophenoxyphenyl))-α,α'-dichlorosuccinimide, N-(p-taurylphenyl)-α,α'-dichlorosuccinimide, sodium salt of N-(p-sulfophenyl)-α,α'-dichlorosuccinimide, N-(α-(2-sulfaminonaphthyl))-α,α'-dichlorosuccinimide, N-(1-(9-sulfinophenanthryl))-α,α'-dichlorosuccinimide, sodium salt of N-(p-carboxyphenyl)-α,α'-dichlorosuccinimide, N-(α-(2-carboxynaphthyl))-α,α'-dichlorosuccinimide and N-(8-(7-carboxycoumaryl))-α,α'-dichlorosuccinimide.

In general our fungicides are effective over a wide range of concentrations. Thus, at concentrations as high as 50,000 p. p. m., we obtain an effective fungicide formulation which is safe for agricultural applications and is particularly suitable for textile and surface coating protection. Even at concentrations as low as 0.1 p. p. m. we obtain protection. Furthermore, we can employ still higher concentrations for certain applications to inanimate objects and can formulate higher concentrations which are stable for storage or handling, for example, in the range of 50 weight per cent active ingredient. In general, however, we prefer the range of 0.1 to 10,000 p. p. m. for effective fungicidal use.

Having thus described the novel N-aryl-α,α'-dichlorosuccinimides of our invention, methods for their manufacture, and having demonstrated their utility, illustrated methods of formulating effective fungicidal compositions and methods of applying such formulations, we do not intend that our invention be limited except as by the appended claims.

We claim:

1. New composition of matter having the structure

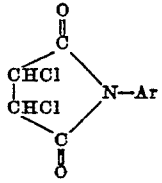

wherein Ar is an aryl group.

2. The method of combatting attack by fungus organisms which comprises applying to materials susceptible to such attack a fungicidal composition consisting essentially of a formulation of the composition of claim 1.

3. As a new composition of matter, N-phenyl-α,α'-dichlorosuccinimide.

4. As a new composition of matter, N-(p-chlorophenyl)-α,α'-dichlorosuccinimide.

5. As a new composition of matter, N-(2,5-dichlorophenyl)-α,α'-dichorosuccinimide.

6. As a new composition of matter, N-(p-tolyl)-α,α'-dichorosuccinimide.

7. As a new composition of matter, N-(p-diphenyl)-α,α'-dichlorosuccinimide.

8. A fungicidal composition consisting of

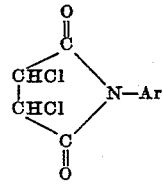

wherein Ar is an aryl group and a fungicidally inert surface-active dispersing agent.

9. The composition of claim 1 wherein Ar is a haloaryl group.

10. The composition of claim 1 wherein Ar is a hydrocarbon-substituted aryl group.

References Cited in the file of this patent
UNITED STATES PATENTS

| | | |
|---|---|---|
| 2,205,558 | Flett | June 25, 1940 |
| 2,262,262 | Speer | Nov. 1, 1941 |

OTHER REFERENCES

Contributions from Boyce Thompson Institute for July to September 1951, vol. 16, No. 7, pp. 313, 315 to 318, 330 to 346.

Anschutz: Berichte, vol. 21, p. 957.
Anschutz: Annalen, vol. 295, pp. 32, 33, 69.
Auwers: Annalen, vol. 309, p. 347.